United States Patent
Feliss et al.

(10) Patent No.: US 7,283,329 B2
(45) Date of Patent: Oct. 16, 2007

(54) HEAD SHOCK RESISTANCE AND HEAD LOAD/UNLOAD PROTECTION FOR REDUCING DISK ERRORS AND DEFECTS, AND ENHANCING DATA INTEGRITY OF DISK DRIVES

(75) Inventors: Norbert A. Feliss, Sunnyvale, CA (US); Yiyun Huang, Milpitas, CA (US); Jennifer Lu, San Jose, CA (US); Wing Tsang Tang, Palo Alto, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 0 days.

(21) Appl. No.: 11/287,942

(22) Filed: Nov. 28, 2005

(65) Prior Publication Data

US 2006/0082926 A1    Apr. 20, 2006

Related U.S. Application Data

(62) Division of application No. 09/804,105, filed on Mar. 12, 2001, now Pat. No. 6,995,952.

(51) Int. Cl.
    *G11B 5/60* (2006.01)
(52) U.S. Cl. .................... 360/235.3; 360/237
(58) Field of Classification Search ............. 360/235.3, 360/235.2
    See application file for complete search history.

(56) References Cited

U.S. PATENT DOCUMENTS

| | | | |
|---|---|---|---|
| 5,761,003 A | 6/1998 | Sato | |
| 5,768,055 A | 6/1998 | Tian et al. | |
| 5,774,303 A | 6/1998 | Teng et al. | |
| 5,796,551 A | 8/1998 | Samuelson | |
| 5,841,608 A | 11/1998 | Kasamatsu et al. | |
| 5,864,452 A | 1/1999 | Hirano et al. | |
| 5,886,856 A | 3/1999 | Tokuyama et al. | |
| 5,910,864 A | 6/1999 | Hira et al. | |
| 5,923,499 A | 7/1999 | Hagen | |
| 6,040,959 A | 3/2000 | Kobayashi et al. | |
| 6,069,769 A | 5/2000 | Dorius et al. | |
| 6,229,671 B1 | 5/2001 | Boutaghou et al. | |
| 6,324,031 B1 | 11/2001 | Comstock et al. | |
| 6,373,661 B1 * | 4/2002 | Tokuyama et al. | 360/236.6 |
| 6,462,909 B1 | 10/2002 | Boutaghou et al. | |
| 6,483,668 B2 | 11/2002 | Hipwell et al. | |
| 2001/0019467 A1 * | 9/2001 | Otsuka et al. | 360/235.2 |

* cited by examiner

*Primary Examiner*—Brian E. Miller
(74) *Attorney, Agent, or Firm*—Bracewell & Giuliani LLP

(57) ABSTRACT

A slider in a disk drive is shock-protected with an overcoat layer of either metal or polymer directly on the areas of the slider that are prone to contact the disk when the slider is loaded off the platform, or when the slider is shocked while in operation over the data zone of the disk. The material used to form the layer absorbs shock and reduces wear, and is bonded or sputtered to the head in a region other than the pads of the air bearing surface. This region is typically the reactive ion etched (RIE) surface area and is slightly below the pads of the air bearing surface of the head. In an alternate version of the invention, the slider is protected by covering only the edges of the slider with a suitable material. Finally, the entire slider may be encased with the overcoating except for the pads of the air bearing surface.

9 Claims, 2 Drawing Sheets

HEAD SHOCK RESISTANCE AND HEAD LOAD/UNLOAD PROTECTION FOR REDUCING DISK ERRORS AND DEFECTS, AND ENHANCING DATA INTEGRITY OF DISK DRIVES

RELATED APPLICATIONS

This Divisional Application claims the priority of Parent Application Ser. No. 09/804,105, filed on Mar. 12, 2001 now U.S. Pat. No. 6,995,952, and entitled "Head Shock Resistance and Head Load/Unload Protection for Reducing Disk Errors and Defects, and Enhancing Data Integrity of Disk Drives".

BACKGROUND OF THE INVENTION

1. Technical Field

The present invention relates in general to an improved disk drive, and in particular to an improved apparatus and method for protecting disks in a disk drive from head shock-induced errors and damage.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Disks are rigid platters that are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the actuator assembly. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

Disk drive sliders are susceptible to micro-cracks, fissures, corner-rounding, and edge-rounding effects due to the shock that results from the sliders landing on the disk from a load/unload platform. Disk damage may ensue when sliders come into direct contact with the disk surface when the slider air bearing has not been well established. This is typically seen in shock events, e.g., when loading heads onto the disk surface from a load/unload platform. For this reason, a disk area near the load platform is usually not qualified to be a data zone since the shock caused by errors in loading the sliders onto the disk causes dings and scratches in the media.

In addition, non-operational and operational z-axis shock can also create head and disk damage due to the high deceleration forces that occur when the disk drive is bumped or dropped during operation. This problem is especially true of mobile drives. To protect the sliders and disks from these shock events, an improved technique is needed that will aid in shock protection, and minimize wear and scarring events that happen when the slider contacts the disk at high speeds.

SUMMARY OF THE INVENTION

One embodiment of a slider in a disk drive has a layer of shock protection by means of an overcoat layer of either metal or polymer only on the areas of the slider that are prone to contact the disk when the head is loaded off the platform, or when the head is shocked while in operation over the data zone of the disk. The material used to form the layer absorbs shock and reduces wear, and is bonded or sputtered to the slider in a region other than the air bearing surface. This region is typically the reactive-ion etched surface area and is slightly recessed below the air bearing surface of the slider. In an alternate version of the invention, the slider is protected by covering only the edges of the slider with a suitable material.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
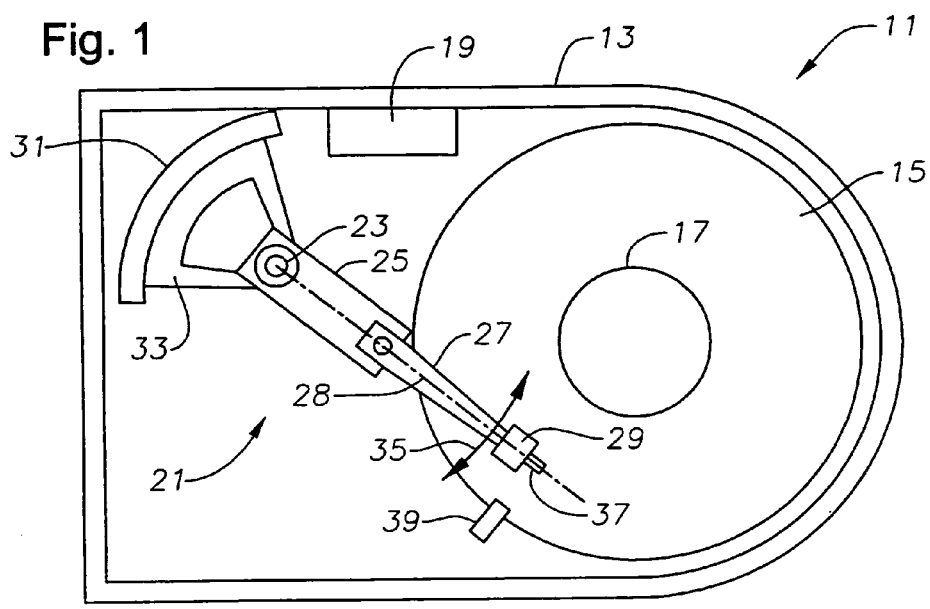
FIG. 1 is a plan view of a disk drive constructed in accordance with the present invention.

Referring to FIG. 1, a schematic drawing of one embodiment of an information storage system comprising a magnetic hard disk file or drive 11 for a computer system is shown. Drive 11 has an outer housing or base 13 containing a plurality of stacked, parallel magnetic disks 15 (one shown) which are closely spaced apart. Disks 15 are rotated by a spindle motor located therebelow about a central drive hub 17. An actuator 21 comprises a plurality of stacked, parallel actuator arms 25 (one shown) in the form of a comb that is pivotally mounted to base 13 about a pivot assembly 23. A controller 19 is also mounted to base 13 for selectively moving the comb of arms 25 relative to disks 15.

In the embodiment shown, each arm 25 has extending from it a pair of parallel, cantilevered load beams or suspensions 27 with a longitudinal axis 28. A head gimbal assembly 29 having at least one magnetic read/write head mounted on a slider is secured to a flexure that is flexibly mounted to each suspension 27. The read/write heads magnetically read data from and/or magnetically write data to disks 15. Suspensions 27 and their flexures have a spring-like quality which biases or maintains them in substantially parallel relationship relative to one another. A motor voice coil 31 housed within a conventional voice coil motor magnet assembly (not shown) is also mounted to arms 25 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and typically move in unison with one another. Each suspension 27 also has a load/unload tab 37 for engaging a ramp 39 located adjacent to the radial outer edge of disk 15 during loading and unloading sequences.

Figure 2:
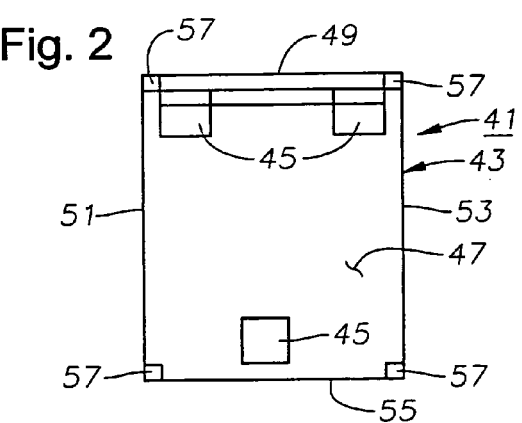
FIG. 2 is a plan view of a first embodiment of a head for the disk drive of FIG. 1 and is constructed in accordance with the invention.

Referring now to FIG. 2, a first embodiment of a slider 41 having a generally rectangular base with a top air bearing side 43 is shown. Air bearing side 43 of slider 41 comprises a patterned set of elements, such as air bearing surface (ABS) pads 45 and one irregularly-shaped pocket surface 47 recessed from ABS pads 45. The size, shape, and pattern of ABS pads 45 are merely representative of those available. For reference purposes, a longitudinal direction is defined vertically from top to bottom, and a lateral direction is defined horizontally from side to side (left and right). Pocket 47 is manufactured using standard etching techniques such as reactive ion etching (RIE) and ion milling (M), for example. Common etch depths range from about 0.1 to 5 microns. The top surface of the ABS pads 45 are also known as air bearing surfaces (ABS). In the embodiment shown, slider 41 has three protruding ABS pads 45 and one continuous but very irregular pocket 47 (approximately 1.50 microns recessed from ABS pads 45) that extends to portions of the leading edge 49, lateral edges 51, 53, and trailing edge 55. Lateral edges 51, 53 also represent the inner and outer radial directions, respectively, of disk 15. The trailing edge 55 of slider 41 is located along the rear edge of pocket 47.

In each of the four corners of air bearing side 43 there is formed a layer 57 of shock-absorbing and wear-resisting material that can be bonded or sputtered to pocket 47. These protrusions 57 are easily manufactured since slider 41, which is made in a wafer methodology, can be easily sputtered with rubbing or tribo-resistant material. Each of the sliders in the process batch can be masked off in the various critical regions and the sputter material can be attached in the appropriate locations, such as corners 57. The material sputtered or glued to the slider 41 is ideally attached to pocket 47. The polymer or metal protrusions 57 on the corners are suitably slightly higher than the ion-milled surface of pocket 47, as long as it will not affect the flying height of slider 41. In one version, the presence of the material on the corners raises those protrusions 57 to within approximately 0.15 microns of the air bearing surface of pads 45. If flying height is affected, air bearing 43 may be redesigned to compensate for the material added to the slider.

The material sputtered on slider 41 can range from metals, such as Au, Cu, Ag, Pt, Sn, and Al, and copper oxide. Polymer materials that also can be used include Teflon®, Vectra®, and other materials from which the load/unload platform 39 (FIG. 1) is made. In addition, carbon and doped carbon in the form of nitrogenated or hydrogenated carbon are suitable.

The metal or polymer material that is deposited onto the slider can be selected on the basis of a good tribological match between the deposited material and the surface of the disk. Because disk surfaces range from aluminum to glass substrates with carbon overcoatings, including hard, soft, cold, and hot sputtered-type carbon, there are many different matching materials that provide excellent wear properties. For example, both copper and gold are excellent sputtered metals. When the slider surface is appropriately sputtered with a thin layer of copper or gold, excellent wear properties are obtained. Load/unload experiments showed that no soft or hard errors were generated in the loading zone which had been pre-patterned with magnetic digital data. Without the copper coating, a "bare" slider causes many hard errors and loss of magnetic digital data and, upon close examination, the surface of the disk shows scarring and scratching.

The tribo-coating serves as a tribological shock resistance layer at or below the ABS in situations where the slider comes into direct contact with the disk and cannot establish a thin-film air bearing protection between the ABS pads and the disk. Because of rolling or pitching of the slider when under shock or loading from the load platform, portions of the slider come into direct contact with the disk surface. However, due to the excellent wear properties of the added materials, no deleterious wear effects are realized. The disk surface is protected from scarring, scratching, and dings. The magnetic data information is thereby protected from irreversible erasures. The coated portions of the slider are protected as well, but are allowed to have some "wear-in" phenomenon. Because of the critical choice of a soft material or excellent wear material deposited on the slider, the deposited material is preferentially worn away to allow the disk surface to remain pristine and without error. Thus, the slider becomes a wear protector that reduces erasures, and tracks or sectors from disappearing when the disk drive is bumped, dropped, or experiences many load/unload operations.

Figure 3:
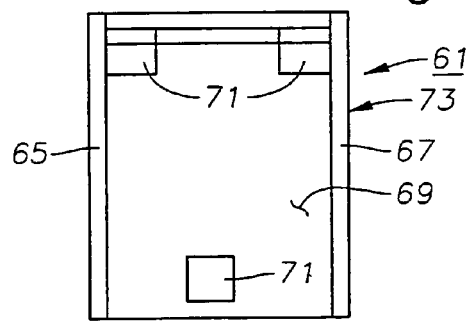
FIG. 3 is a plan view of a second embodiment of a head for the disk drive of FIG. 1 and is constructed in accordance with the invention.
Figure 4:
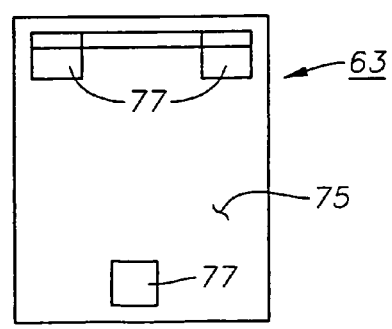
FIG. 4 is a plan view of a third embodiment of a head for the disk drive of FIG. 1 and is constructed in accordance with the invention.
Figure 5:
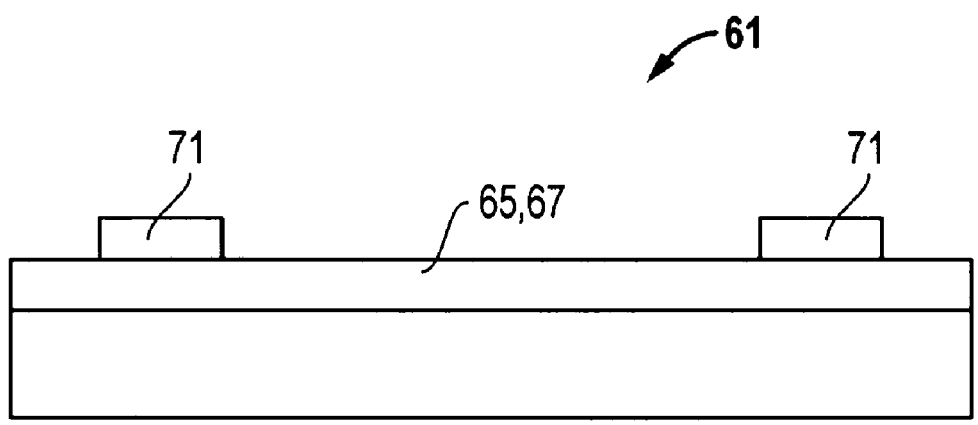
FIG. 5 is a side view of the head of FIG. 3.

Referring now to FIGS. 3-5, alternate embodiments of the present invention are depicted as sliders 61 and 63, respectively. Slider 61 of FIGS. 3 and 5 is essentially identical to slider 41 of FIG. 2, except that it has been coated along the lateral side edges 65, 67 of its etch pocket 69 instead of its corners. As described above for the previous embodiment, the pads 71 of the air bearing 73 are not coated. However, the pocket 75 on slider 63 of FIG. 4 is completely encased in the overcoating material. Again, only the ABS pads 77 are not coated. Pads 77 may be shielded from the coating by masking them off during the entire sputtering process. This version of the invention may be advantageous in certain manufacturing situations where corners or side edges are not preferred, and the entire surface of the slider may be protected by the addition of an overcoat.

The present invention has several advantages. The shock and wear protection of hard disk drive sliders is achieved by sputtering or layering alternate materials on the corners, sides, edges, or entire surface of the slider, except for the ABS pad surfaces. this protection is a tribological wear enhancement of the sliders. With this new type of slider that is protected by alternate composite materials, disk defects and hard or soft errors can be minimized or totally eliminated. Disk dings and scratches, which usually occur when the slider unloads onto the surface of the disk, can be eliminated by affording a "soft contact protection" due to the excellent tribological wear material located on the slider. It is these portions of the slider that first come into contact with the disk when the slider does an unload operation from the ramp. During the unload operation, the air bearing is not given sufficient time to establish, and, due to the roll attitude of the slider oriented to the disk, the first feature that comes into contact with the disk is typically the edge or corner closest to the disk relative to the slider. When a material such as copper or gold is attached to the slider surface, the hard errors disappear entirely when compared to a control slider without any coating. With this type of slider, the load/unload zone which typically does not contain data, can now become a dedicated data real estate zone.

The present invention also aids disk drives in handling operational and non-operational shock. Currently, the shock resistance nature of disk drives is rather poor. Typical values for shock protection requires operating disk drives under 350 g's for non-operational shock, and 60 g's for operational shock. With sliders fabricated with the shock-protecting materials as disclosed above, these shock value tolerances can increase by two or three fold. This increase is due to the softer material being in contact with the disk surface, rather than a harder surface of the slider (typically, the alumina and titanium carbide composite used in sliders has a very high hardness). The soft material overcoat is somewhat elastic and more shock-forgiving than the base material of the slider. In a shock situation, such as dropping or bumping the disk drive, the sliders contact the disks when they are operating over a data region. The first part of the slider to contact the disk is an edge or corner. The material on the slider elastically bounces off the disk without inflicting any damage to the disk surface, and thus protects data integrity at that sector and track position.

While the invention has been shown or described in only some of its forms, it should be apparent to those skilled in the art that it is not so limited, but is susceptible to various changes without departing from the scope of the invention.

What is claimed is:

1. A slider for a disk drive, comprising:
    a supporting structure having a top surface with a pocket, a plurality of protrusions protruding from the pocket where a protruding end of the protrusions forms an air bearing surface, a leading edge, a trailing edge, lateral side edges extending between the leading and trailing edges, with the leading and trailing edges being spaced apart from each other in a longitudinal direction, and the lateral side edges being spaced apart from each other in a lateral direction;
    a coating on portions of the top surface of the supporting structure other than the protrusions, the coating being formed from a material that is softer than the supporting structure, and the coating is located only on the lateral side edges and extends longitudinally from the leading edge completely to the trailing edge but not laterally between the lateral side edges.

2. The slider of claim 1 wherein the coating on the lateral side edges has elongated rectangular shapes and is recessed in a direction perpendicular to the top surface from the protrusions by about 0.15 microns, the pocket is recessed from the protrusions by about 1.5 microns, and the pocket extends to portions of both the leading and trailing edges.

3. The slider of claim 1 wherein the coating is sputtered onto the portions of the top surface, there are only three protrusions including two protrusions adjacent to but spaced apart from the leading edge, and one protrusion adjacent to but spaced apart from the trailing edge.

4. The slider of claim 3 wherein the material of the coating is a metal, and said two protrusions are laterally spaced apart from each other and longitudinally spaced apart from said one protrusion.

5. The slider of claim 3 wherein the material of the coating is selected from the group consisting of metals and polymers, said two protrusions are spaced laterally inboard from the lateral side edges, and said one protrusion is spaced laterally inboard of both of said two protrusions.

6. A slider for supporting a transducer for use in a disk drive, comprising:
    a supporting structure having a top surface, a leading edge, a trailing edge, two lateral side edges extending between the leading and trailing edges, the leading and trailing edges being spaced apart from each other in a longitudinal direction, the two lateral side edges being spaced apart from each other in a lateral direction, a pocket with three air bearing protrusions, only two shock-absorbing protrusions protruding from the pocket where protruding ends of the air bearing protrusions form an air bearing surface, the two shock-absorbing protrusions comprising a material that is softer than the supporting structure, and the two shock-absorbing protrusions extending exclusively in the longitudinal direction along only the two lateral side edges, respectively, from the leading edge completely to the trailing edge and not in the lateral direction between the lateral side edges; and
    the shock-absorbing protrusions are recessed in a direction perpendicular to the top surface from the air bearing protrusions by about 0.15 microns, the pocket is recessed from the shock-absorbing protrusions by about 1.5 microns, and the pocket extends to portions of both the leading and trailing edges.

7. The slider of claim 6 wherein the two shock-absorbing protrusions are sputtered onto the top surface, two of the air bearing protrusions are adjacent to but spaced apart from the leading edge, and one of the air bearing protrusions is adjacent to but spaced apart from the trailing edge.

8. The slider of claim 6 wherein the two shock-absorbing protrusions comprise a material selected from the group consisting of metals and polymers, two of the air bearing protrusions are laterally spaced apart from each other, laterally inboard from the lateral side edges, longitudinally spaced apart from a third one of the air bearing protrusions, and the third one of the air bearing protrusions is spaced laterally inboard of the two other air bearing protrusions and the trailing edge.

9. A magnetic recording device for reading or writing magnetically, comprising:
- a disk comprising a substrate and a metallic magnetic layer;
- a head supported on a slider for magnetically reading data to or writing data from the magnetic layer on the disk, the slider comprising a supporting structure having a top surface, a leading edge, a trailing edge, two lateral side edges extending between the leading and trailing edges, the leading and trailing edges being spaced apart from each other in a longitudinal direction, the two lateral side edges being spaced apart from each other in a lateral direction, a pocket having three air bearing protrusions and only two shock-absorbing protrusions protruding from the pocket where protruding ends of the three air bearing protrusions form an air bearing surface, and the two shock-absorbing protrusions comprise a material that is softer than the supporting structure;
- a motor operable to rotate the disk;
- an actuator connected to the slider for moving a head across the disk; and the two shock-absorbing protrusions have elongated rectangular shapes and extend exclusively in the longitudinal direction along only the two lateral side edges, respectively, from the leading edge completely to the trailing edge and not in the lateral direction between the lateral side edges the lateral side edges are recessed in a direction perpendicular to the top surface from the air bearing protrusions by about 0.15 microns, the pocket is recessed from the shock-absorbing protrusions by about 1.5 microns, the pocket extends to portions of leading and trailing edges, two of the air bearing protrusions are adjacent to but spaced apart from the leading edge, one of the air bearing protrusions is adjacent to but spaced apart from the trailing edge, two of the air bearing protrusions are laterally spaced apart from each other, laterally inboard from the lateral side edges, longitudinally spaced apart from a third one of the air bearing protrusions, and the third one of the air bearing protrusions is spaced laterally inboard of the two other air bearing protrusions and the trailing edge.

* * * * *